United States Patent
DiGioacchino et al.

(10) Patent No.: US 11,225,235 B2
(45) Date of Patent: Jan. 18, 2022

(54) TRAILER BRAKE GAIN DETERMINATION

(71) Applicant: GM GLOBAL TECHNOLOGY OPERATIONS LLC, Detroit, MI (US)

(72) Inventors: Patrick DiGioacchino, Niagara Falls (CA); Alexander Barath, Brighton, MI (US); Hasan Alper Hepguvendik, Toronto (CA); Avesta Goodarzi, Waterloo (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 159 days.

(21) Appl. No.: 16/678,307

(22) Filed: Nov. 8, 2019

(65) Prior Publication Data

US 2021/0139008 A1 May 13, 2021

(51) Int. Cl.
| | | |
|---|---|---|
| *B60T 8/18* | (2006.01) | |
| *B60T 8/17* | (2006.01) | |
| *B60W 10/18* | (2012.01) | |
| *B60T 13/66* | (2006.01) | |

(52) U.S. Cl.
CPC .......... *B60T 8/1887* (2013.01); *B60T 8/1708* (2013.01); *B60T 8/1806* (2013.01); *B60W 10/18* (2013.01); *B60T 13/662* (2013.01)

(58) Field of Classification Search
CPC .... B60W 10/18; B60T 8/1708; B60T 8/1887; B60T 13/662; B62D 59/04; B60D 1/01; B60D 1/62

USPC ...................................................... 303/22.1
See application file for complete search history.

(56) References Cited

U.S. PATENT DOCUMENTS

| | | | | |
|---|---|---|---|---|
| 4,232,910 A | * | 11/1980 | Snyder ................. | B60T 8/1708 188/181 C |
| 2001/0038239 A1 | * | 11/2001 | Ehrlich ................. | G07C 5/008 303/20 |
| 2007/0001509 A1 | * | 1/2007 | Brown .................. | B60K 35/00 303/123 |
| 2018/0099660 A1 | * | 4/2018 | Weigert ................ | B60W 10/18 |
| 2018/0229786 A1 | * | 8/2018 | Weaver ............... | H04W 84/042 |

FOREIGN PATENT DOCUMENTS

AU          2015101456 A4 *  11/2015

OTHER PUBLICATIONS

English machined translation of AU-2015101456 A4, Nov. 12, 2015.*

* cited by examiner

*Primary Examiner* — Robert A. Siconolfi
*Assistant Examiner* — San M Aung
(74) *Attorney, Agent, or Firm* — Cantor Colburn LLP

(57) ABSTRACT

Trailer brake gain in a towing configuration of a tow vehicle and a trailer is determined by providing, to a processor, trailer wheel rotation information. The processor provides trailer brake control signals at a plurality of different evaluation trailer brake gains. The processor determines the trailer brake gain based upon the trailer wheel rotation information corresponding to the plurality of different evaluation trailer brake gains.

20 Claims, 6 Drawing Sheets

TRAILER BRAKE GAIN DETERMINATION

INTRODUCTION

Many vehicles are designed to accommodate the towing or trailering of various loads, including without limitation: cargo hoppers, campers, boats, and sometimes other vehicles. Many trailers are equipped with electrically actuated braking systems, for example electromechanically actuated systems or electric-over-hydraulic systems. Such trailer braking systems are known to apply trailer brakes in response to a trailer brake control signal. The trailer brake control signal may be provided by a brake controller, for example an aftermarket controller that senses deceleration of the vehicle and provides a trailer brake control signal related thereto. Alternatively, original equipment manufacturers (OEM) are known to integrate trailer brake control functions with the vehicle brake controller and provide a trailer brake control signal which may be proportional to the brake torque requested by the operator or applied by the vehicle braking control system. Vehicles with integrated brake controllers may include an operator interface for manually setting trailer brake gain. The operator interface may include gain selection buttons for incrementing and decrementing the trailer brake gain and a trailer brake apply lever. Manually setting trailer brake gain requires substantial straight-line travel, whether continuous on long road segments or repetitive on shorter road segments. Manually setting trailer brake gain may require a high degree of driver attention to the trailer and its response to driver induced trailer braking and is highly dependent upon the capabilities of the driver and available road and traffic conditions required for evaluating trailer brake gain settings. Trailer gain is desirably reset any time the trailer load is varied or road conditions change; however, opportunities for manually setting trailer brake gain may not coincide with load changes due to road and traffic conditions required for evaluating trailer brake gain settings.

SUMMARY

In one exemplary embodiment, an apparatus for determining a trailer brake gain in a towing configuration of a tow vehicle and a trailer includes a trailer brake system responsive to a trailer brake apply signal to apply trailer brakes. At least one trailer wheel includes a corresponding rotation sensor providing trailer wheel rotation information for the at least one trailer wheel. A brake controller is configured to implement an automated trailer brake gain determination process upon validation of predetermined conditions. The automated trailer brake gain determination process includes monitoring the trailer wheel rotation information, providing trailer brake control signals at a plurality of different evaluation trailer brake gains, and determining the trailer brake gain based upon trailer wheel rotation information corresponding to the plurality of different evaluation trailer brake gains.

In addition to one or more of the features described herein, the predetermined conditions include the towing configuration travelling along a straight path above a predetermined speed.

In addition to one or more of the features described herein, the trailer brake control signals are provided iteratively to converge upon the largest evaluation trailer brake gain not associated with a lock-up condition of the at least one trailer wheel as the trailer brake gain.

In addition to one or more of the features described herein, convergence upon the largest evaluation trailer brake gain includes a binary search algorithm.

In addition to one or more of the features described herein, convergence upon the largest evaluation trailer brake gain includes a serial search algorithm.

In addition to one or more of the features described herein, trailer brake control signals are provided in response to an operator request to apply trailer brakes.

In addition to one or more of the features described herein, the lock-up condition includes at least one of a comparison of trailer wheel speed and tow vehicle wheel speed, a comparison of trailer wheel speed to a threshold speed, and a comparison of a rate of change in trailer wheel speed to a threshold rate.

In addition to one or more of the features described herein, the rotation sensor is integrated with a tire pressure monitor sensor.

In addition to one or more of the features described herein, the rotation sensor providing trailer wheel rotation information includes wireless communication of trailer wheel rotation information.

In addition to one or more of the features described herein, the rotation sensor includes a vision system.

In addition to one or more of the features described herein, the brake controller is further configured to terminate the automated trailer brake gain determination process upon invalidation of at least one of the predetermined conditions.

In another exemplary embodiment, a method for determining a trailer brake gain in a towing configuration of a tow vehicle and a trailer includes providing, to a processor, trailer wheel rotation information. The method further includes providing, by the processor, trailer brake control signals at a plurality of different evaluation trailer brake gains, and determining, by the processor, the trailer brake gain based upon the trailer wheel rotation information corresponding to the plurality of different evaluation trailer brake gains.

In addition to one or more of the features described herein, the trailer brake control signals are provided iteratively to converge upon the largest evaluation trailer brake gain not associated with a trailer wheel lock-up condition as the trailer brake gain.

In addition to one or more of the features described herein, the trailer brake control signals are provided in response to an operator request to apply trailer brakes.

In addition to one or more of the features described herein, the convergence upon the largest evaluation trailer brake gain includes a binary search algorithm.

In addition to one or more of the features described herein, the convergence upon the largest evaluation trailer brake gain includes a serial search algorithm.

In addition to one or more of the features described herein, the lock-up condition includes at least one of a comparison of trailer wheel speed and tow vehicle wheel speed, a comparison of trailer wheel speed to a threshold speed, and a comparison of a rate of change in trailer wheel speed to a threshold rate.

In addition to one or more of the features described herein, the trailer wheel rotation information is provided via wireless communication.

In yet another exemplary embodiment, a method for determining a trailer brake gain in a towing configuration of a tow vehicle and a trailer includes detecting, by a processor, that the trailer and tow vehicle are coupled into the towing configuration. The processor conveys to a tow vehicle operator predetermined conditions required to automatically determine the trailer brake gain. The predetermined conditions include driving the towing configuration in a straight path above a predetermined speed. Trailer wheel rotation is sensed with a tire pressure monitor configured to sense trailer wheel rotation and wirelessly communicate trailer wheel rotation information to the processor. A request for engagement of the trailer brakes while the predetermined conditions are validated is received by the processor. The processor iteratively provides trailer brake control signals at a plurality of different evaluation trailer brake gains to converge upon the largest evaluation trailer brake gain not associated with a trailer wheel lock-up condition as the trailer brake gain.

In addition to one or more of the features described herein, the convergence upon the largest evaluation trailer brake gain includes one of a binary search algorithm and a serial search algorithm.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
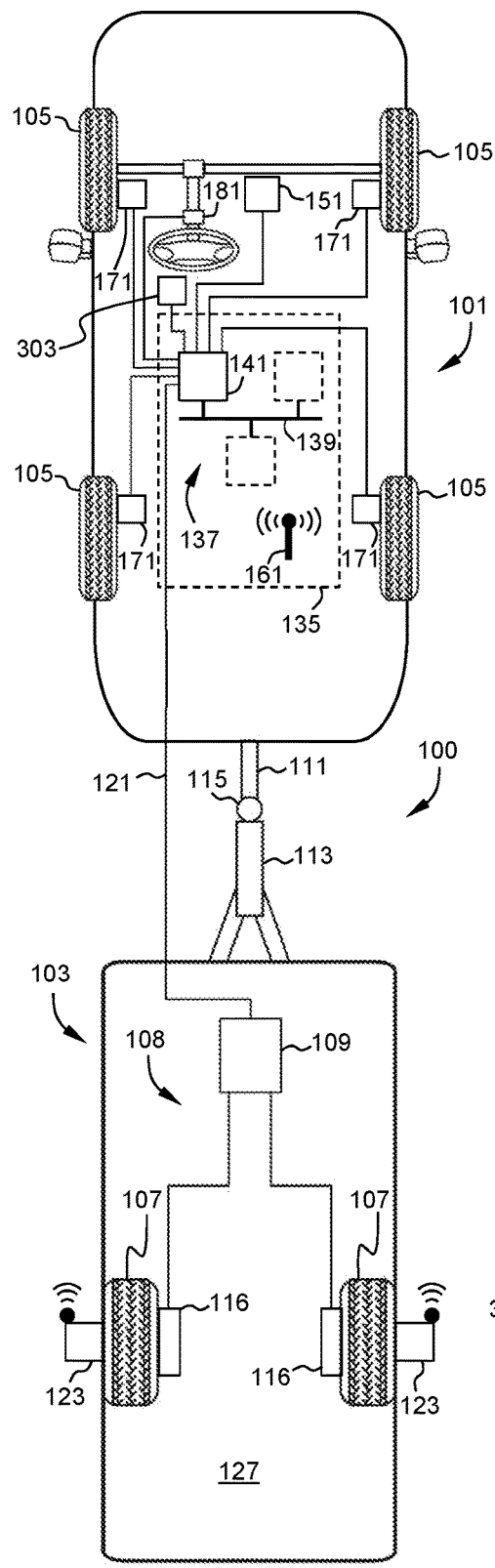
FIG. 1 illustrates an exemplary vehicle and trailer configuration, in accordance with the present disclosure.

The following description is merely exemplary in nature and is not intended to limit the present disclosure, its application or uses. Throughout the drawings, corresponding reference numerals indicate like or corresponding parts and features. As used herein, control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, on vehicle networks (e.g. Controller Area Network (CAN), Local Interconnect Network (LIN) and in-plant and service-related networks. Control module functions as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

In accordance with the present disclosure, a method and system for evaluating vehicle and trailer towing configurations is set forth herein and in the various drawings. FIG. 1 illustrates a towing configuration 100 including a tow vehicle 101 coupled to a trailer 103. Tow vehicle 101 may hereafter be referred to as vehicle 101 and is configured with an exemplary receiver hitch and ball mount 111 including a ball, and the trailer 103 is configured with a complementary ball socket coupler 115 at the end of a tongue 113. Alternative couplings are envisioned for towing configuration embodiments including, by way of example, pick-up bed mounted gooseneck and fifth wheel hitches. Vehicle 101 may be a four-wheel vehicle including a tire and wheel 105 at each corner. Trailer 103 is exemplified as a single-axle trailer including a tire and wheel 107 on each lateral side. Exemplary trailer includes a bed 127 supported on a trailer frame which in turn is coupled by a sprung or unsprung suspension to the wheels 107. Trailer 103 is exemplary and not limiting, it being understood that alternative trailer configurations may, for example, include multiple axles (tandem axle, tri-axle, etc.), be open or closed, be adapted for hauling and dumping loads, have tilting beds, or have center lift mechanisms and narrow wheel base (e.g. for pontoon boats). As used herein, axle is understood to mean a pair of laterally opposing wheels and tires on a vehicle or trailer. Thus, the vehicle 101 has a front axle including the two front wheels 105, and a rear axle including the two rear wheels 105. The trailer 103 includes one axle including the wheels 107. Also as used herein, tire may refer to a single tire or multiple tires at one side of an axle, for example on a dually pick-up axle or a single or multi-axle dually trailer.

Trailer 103 is configured with a trailer brake system 108. In one embodiment, trailer brake system 108 may include a trailer brake control unit 109 receiving a trailer brake apply signal 121 from tow vehicle 101 and responsive thereto to control friction brakes 116 at each trailer wheel. Trailer brake apply signal 121 may be conveyed via trailering harness wiring (not shown) including a tow vehicle trailering harness coupled to a trailer brake and lighting harness. In one embodiment the trailer brake system 108 is an electric-over-hydraulic (EOH) system and trailer brake control unit 109 includes an electrically operated hydraulic pump and hydraulic reservoir. The EOH system provides controlled hydraulic pressure to each friction brake 116 substantially proportional to the trailer brake apply signal 121. In an alternative embodiment, the trailer brake system 108 is an air-over-hydraulic (AOH) system and trailer brake control unit 109 includes an electrically operated air pump and hydraulic reservoir. The AOH system provides controlled hydraulic pressure to each friction brake 116 substantially proportional to the trailer brake apply signal 121. In another alternative embodiment, the trailer brake system 108 is an electric brake system and trailer brake control unit 109 may include amplification and/or distribution of the trailer brake apply signal 121 to each friction brake 116. Alternatively, an electric brake system may omit trailer brake control unit 109 and provide the trailer brake apply signal 121 directly to each friction brake 116. In either case, the electric brake system provides current to each friction brake 116 substantially proportional to the trailer brake apply signal 121. Such trailer brake systems are generally well known to those having ordinary skill in the art.

Trailer 103 may be further configured to provide wheel rotation information for each trailer wheel 107 by wheel rotation sensors 123. In alternate embodiments, trailer 103 may be configured with a number of wheel rotation sensors 123 less than the number of trailer wheels 107. In alternate embodiments, trailer 103 may be configured with a single wheel rotation sensor 123. In one embodiment, wheel rotation sensors provide trailer wheel rotation information to the tow vehicle wirelessly. In other embodiments, wheel rotation sensors provide trailer wheel rotation information to the tow vehicle through a wired connection via the trailering harness wiring. In one preferred embodiment, wheel rotation sensors 123 may be integrated within a tire pressure monitor (TPM) associated with each wheel. Known TPMs may include acceleration sensors responsive to centrifugal force to generate a signal proportional to wheel speed. Alternatively, TPMs may include a binary "roll switch" to indicate rotation. Such features are known to be incorporated as a means to wake up the TPMs from quiescent periods of inactivity of the associated vehicle. These features may be adapted in accordance with the present disclosure to provide information regarding trailer wheel rotation in a tow vehicle and trailer configuration. For example, the trigger speed of a roll switch may be calibrated appropriately to detect relatively low rotational or road speed of the associated trailer wheel which, when compared with tow vehicle wheel speed or road speed, may be indicative of an actual or impending trailer wheel lock up condition. Known TPMs may be incorporated at one end of a tire valve stem on the interior of the wheel or attached to the opposite end of the valve stem where the valve stem cap is conventionally attached. Known TPMs advantageously employ low power radio frequency communication of information to the associated vehicle, either as part of an original equipment manufacturer (OEM) TPM system or in aftermarket systems for trailers or vehicles not so equipped. OEM TPM systems are known to use remote keyless entry (RKE) system controllers for receiving TPM signals. One skilled in the art therefore may readily adapt known TPMs for communicating trailer wheel rotation information to the tow vehicle for use in accordance with the present disclosure. In accordance with alternate embodiments, wheel rotation sensors 123 may include conventional tone ring hardware including known hall effect, variable reluctance and optical pick-up variations. In yet another alternative embodiment, known vision systems associated with vehicle situational awareness applications, including trailering related applications, may be adapted using known vision processing techniques as a trailer wheel rotation sensor for use in accordance with the present disclosure.

Figure 2:
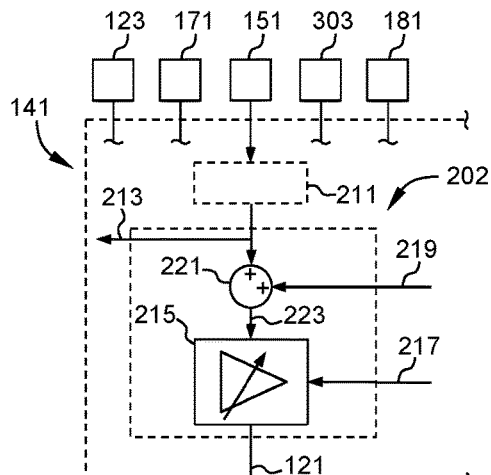
FIG. 2 illustrates exemplary aspects of tow vehicle and trailer brake control, in accordance with the present disclosure.

Tow vehicle 101 may include a control system architecture 135 including a plurality of electronic control units (ECU) 137 which may be communicatively coupled via a bus structure 139 to perform control functions and information sharing, including executing control routines locally and in distributed fashion. Bus structure 139 may include a Controller Area Network (CAN), as well known to those having ordinary skill in the art. One exemplary ECU may include a brake controller 141 primarily performing functions related to tow vehicle brake system monitoring, control and diagnostics. Additional reference is made to FIG. 2 which illustrates trailer brake control module 202 integrated within brake controller 141. Brake controller 141 receives tow vehicle wheel rotation information from wheel speed sensors 171 at each corner of the tow vehicle. Wheel rotation information is useful in anti-lock brake controls and vehicle stability controls, among others. Alternatively, or additionally, wheel rotation information may be available over bus structure 139. Tow vehicle wheel speed information is available to trailer brake control module 202. Steering angle information may be provided to brake controller 141 by steering angle sensor 181 configured to measure angular displacements of a steering system shaft, as well known to those skilled in the art. Alternatively, or additionally, steering angle information may be available over CAN bus. Steering angle information is available to trailer brake control module 202. Brake user interface 151 provides information to brake controller 141 related to driver brake intent in the operation of the tow vehicle braking system. Brake user interface 151 may include multiple sensors or inputs including, for example, brake pedal position and pressure. Brake pedal position may be indicated by a binary brake pedal switch and/or a brake pedal travel sensor. Brake pedal pressure may be indicated by a pressure transducer measuring hydraulic fluid pressure in a master cylinder of the braking system. Brake pedal pressure may directly indicate a tow vehicle intended brake torque 213 to be applied to tow vehicle wheels by the tow vehicle's friction breaks. Alternatively, or additionally, intended brake toque 213 may be a calculated quantity useful in assigning brake torque contributions by friction brakes, electric regeneration, and engine braking in other powertrain and tow vehicle stability controls, for example. Therefore, brake controller 141 may process and interpret the driver brake intent from the brake user interface 151 in a brake intent module 211 to determine tow vehicle intended brake torque 213. In accordance with the present disclosure, trailer brake control module 202 provides trailer brake apply signal 121 to trailer brake control unit 109 on trailer 103. Control system architecture 135 further preferably includes wireless communication 161 for receiving trailer wheel rotation information from trailer wheel rotation sensors 123. Wireless communication 161 may be implemented within brake controller 141 or external thereto, for example as part of an RKE system controller wherein TPM information, including trailer wheel rotation information, may be received and made available to other ECUs including the brake controller 141 via bus structure 139. Brake controller 141 includes a variable trailer brake gain 215 applied to tow vehicle intended brake torque 213. Trailer brake gain 215 may be established in accordance with a trailer brake gain setting 217 that is provided to brake controller 141 subsequent to selection by the tow vehicle operator. In accordance with the present disclosure, the tow vehicle operator may establish the trailer brake gain 215 subsequent to a controller implemented automated trailer brake gain determination process. In accordance with the present disclosure, during the automated trailer brake gain determination process, various evaluation trailer brake gains (evaluation gains) may establish the trailer brake gain as further described herein. Moreover, during the automated trailer brake gain determination process, a substantially maximum trailer brake torque 219 is provided at summing node 221 when trailer brake application is desired. When trailer brake application is not desired during the automated trailer brake gain determination process, a null trailer brake torque 219 is provided at summing node 221. During the automated trailer brake gain determination process, the tow vehicle intended brake torque 213 is null and the trailer intended brake torque 223 is equivalent to the substantially maximum trailer brake torque 219. The trailer intended brake torque 223 is subjected to the trailer brake gain 215 and outputs the trailer brake apply signal 121 to the trailer brake system 108 subsequent to gain adjustment by the provided trailer brake gain setting 217.

Figure 3:
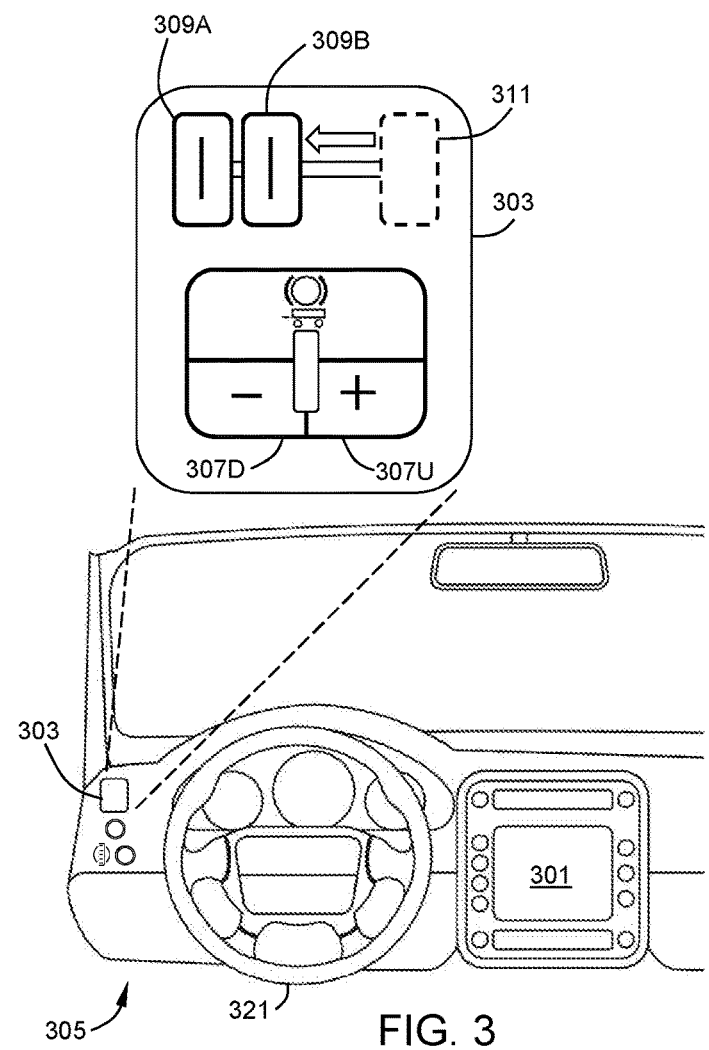
FIG. 3 illustrates an exemplary user interface for manual trailer brake apply and gain setting, in accordance with the present disclosure.

With reference to FIG. 3, an interior view of an exemplary tow vehicle 101 illustrates visual display 301 and manual trailer brake and gain setting controls 303. Display 301 may be located generally central within the dash pad 305 as part of a tow vehicle center stack arrangement. Display 301 may be useful to interface with the tow vehicle operator during the automated trailer brake gain determination process in accordance with the present disclosure. Display 301 may convey written and graphic instructions to the tow vehicle operator and provide a convenient option selection interface in accordance with known touch screen embodiments. In alternative embodiments, display 301 may be located as part of a driver information center located within the instrument cluster behind the steering wheel 321 relative to the operator's position. Option selection interfacing may alternatively be effected through push buttons, knobs, dials and the like as is well known. Manual trailer brake and gain setting controls 303 may be known to tow vehicle operators familiar with setting trailer brake gain. Trailer brake controls 303 may be located within dash pad 305. Controls 303 may include a push button 307D for decrementing the trailer brake gain setting and a push button 307U for incrementing the trailer brake gain setting. Controls 303 may also include trailer brake application paddles including stationary and sliding paddles, 309A and 309B, respectively for manual application of trailer brakes. Sliding paddle is biased in a trailer brake release position 311 and is squeezed toward the stationary paddle 309 to actuate the trailer brakes.

Figure 4:
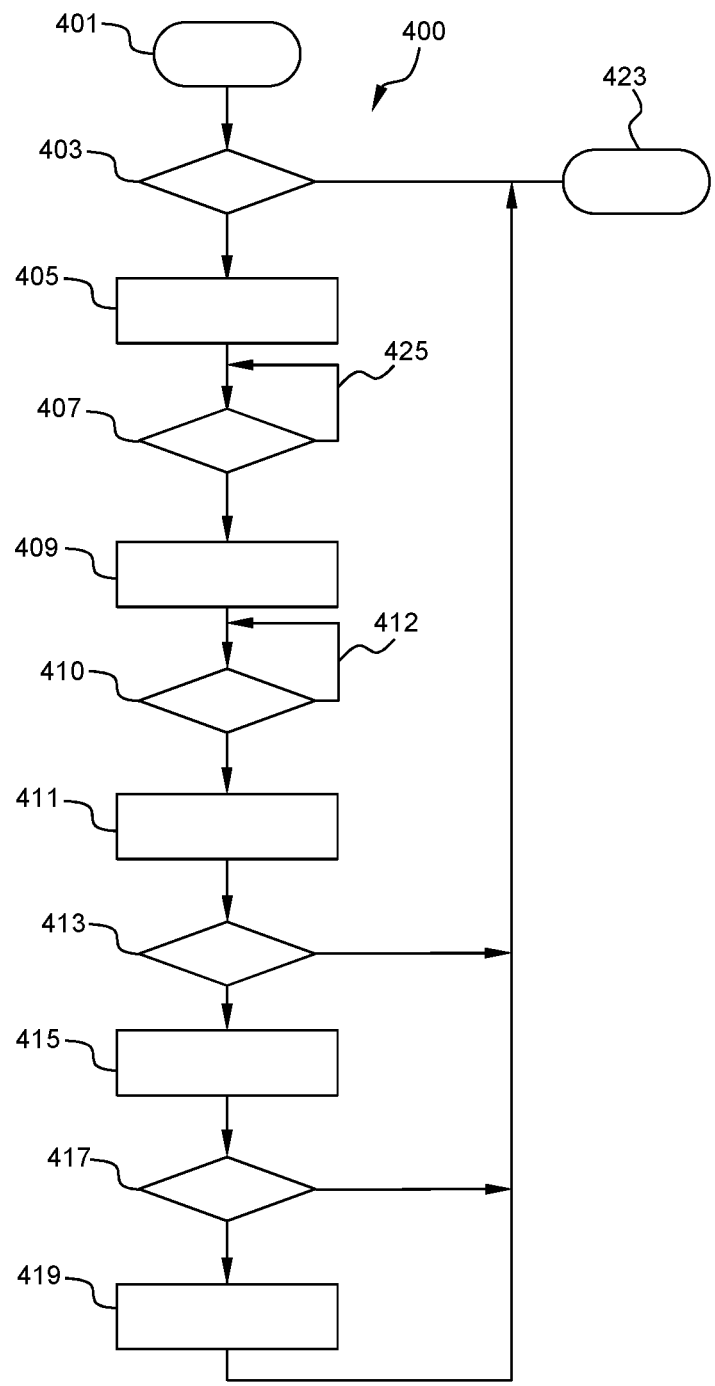
FIG. 4 illustrates an exemplary process for setting trailer brake gain, in accordance with the present disclosure.
Figure 5:
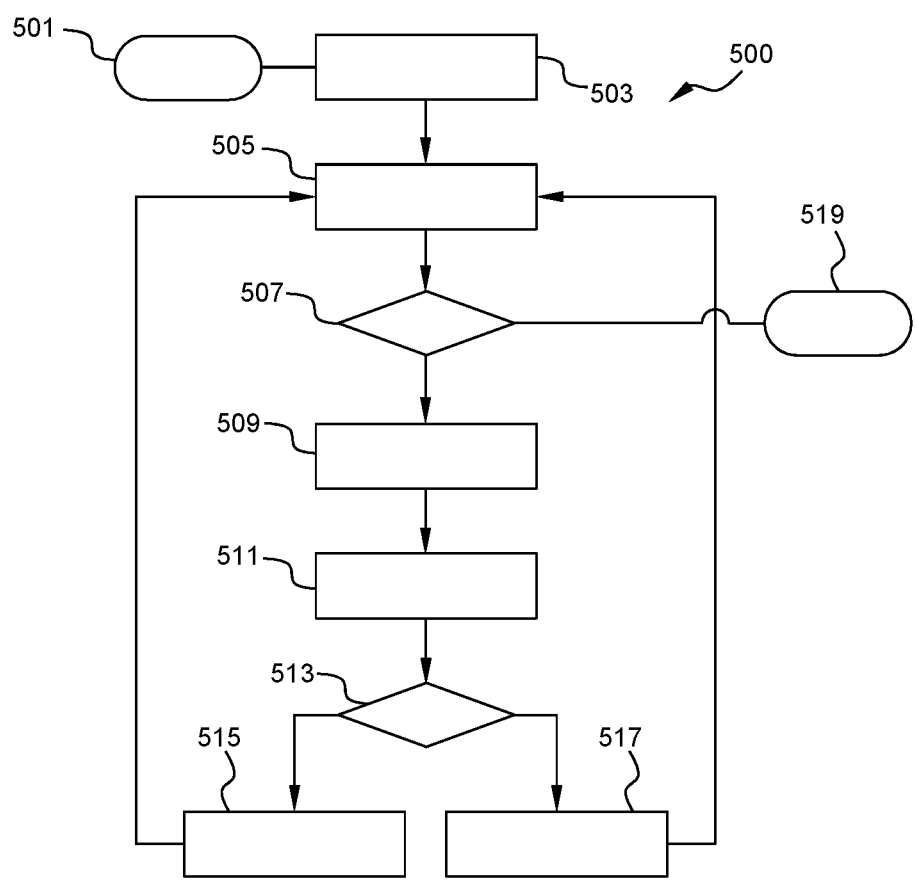
FIG. 5 illustrates an exemplary process for automated trailer brake gain determination, in accordance with the present disclosure.

FIG. 4 illustrates an exemplary process flow for trailer brake gain setting including an automated trailer brake gain determination process in accordance with the present disclosure. Process 400 may be primarily implemented by brake controller 141 through execution of computer program code. However, certain steps may require actions on the part of the tow vehicle operator which may be interpreted through various user interfacing including, for example, interfacing with touch screen display 301, with trailer brake controls 303 or with speech-to-text and text-to-speech interfacing (i.e. dialogue manager). Additionally, the computer implemented aspects of process 400 may be executed within one or more other ECUs in distributed fashion as previously disclosed. Process 400 may be initiated (401) when the brake controller 141 recognizes the tow vehicle trailering harness is coupled to the trailer brake and lighting harness. With the trailer being connected, the operator may be queried whether to proceed with execution of the automated trailer brake gain determination (403). If the tow vehicle operator chooses not to execute automated trailer brake gain determination, then process 400 ends (423). If the tow vehicle operator instead chooses to execute automated trailer brake gain determination, then instructions may be provided to the tow vehicle operator (405) including satisfying entry conditions for automated trailer brake gain determination. These conditions may include driving the towing configuration on a straight path at a recommended speed of, for example, between about 32 and 42 kilometers per hour (kmh). These conditions may further include the brake pedal being undepressed. Limits can be expanded, with good results generally obtainable at lower speed limits of substantially 30 kmh and upper speed limits of substantially 50 kmh. Driving on a straight road segment may be determined by evaluation steering angle information. Brake pedal depression may be indicated by the brake user interface 151. Operation within a speed band may be determined by evaluating tow vehicle wheel rotation information. Until these entry conditions are validated (407), the process 400 will wait (425). When the entry conditions are validated (407), the tow vehicle operator may be instructed to request engagement of the trailer brakes (409), for example using trailer brake controls 303. In an alternate embodiment, the operator may invoke an automated trailer brake request through an alternate interface, for example through a touch screen display selection or dialogue manager. In an alternate embodiment, satisfaction of the entry conditions for automated trailer brake gain determination may invoke an automated trailer brake request without further tow vehicle operator action. Until the trailer brake request is invoked (410), the process 400 will wait (412). With all entry conditions for automated trailer brake gain determination validated (407) and the trailer brake request being invoked (410), the automated trailer brake gain determination is executed (411) (FIG. 5). Process 400 next determines whether the automated trailer brake gain determination was successfully completed or terminated prior to trailer brake gain determination (413). If the automated trailer brake gain determination was not successfully completed, then process 400 ends (423). If the automated trailer brake gain determination successfully completed, then the tow vehicle operator may be notified of success and displayed a suggested trailer brake gain returned from the automated trailer brake gain determination (415). The tow vehicle operator may then be requested to accept or decline the suggested trailer brake gain as the trailer brake gain setting (417). Declining the suggested trailer brake gain as the trailer brake gain setting will result in process 400 ending (423). Accepting the suggested trailer brake gain as the trailer brake gain setting will establish the trailer brake gain 215 in brake controller 141 to the suggested trailer brake gain (419). Subsequent to establish the trailer brake gain 215 in brake controller 141, process 400 ends (423).

FIG. 5 illustrates an exemplary process flow for automated trailer brake gain determination in accordance with the present disclosure. Process 500 may be implemented by brake controller 141 through execution of computer program code. Additionally, process 500 may be executed within one or more other ECUs in distributed fashion as previously disclosed. In one embodiment, process 500 implements a binary search algorithm as set forth in detail herein. Process 500 may be initiated (501) as called for example by the process for trailer brake gain setting (400) (FIG. 4). Variables are initialized (503) including setting high (H) and low (L) trailer brake gain limits to exemplary values 10 and 0, respectively. In the present embodiment, trailer brake gain 215 in brake controller 141 may vary between 0 and 10. Alternative scaling may be employed for alternate high and low limits in accordance with different implementations. Trailer brakes are set to release with null trailer brake torque 219 within trailer brake control module 202. A middle trailer brake gain (M) is set to the mid-point between the current high and low trailer brake gain limits, (H+L)/2 (505). Also, information used in determining conditions for continuing process 500 may be updated, including steering angle information, tow vehicle wheel rotation information, brake pedal position, and trailer brake request (505). Exit conditions are checked (507) to determine whether exiting process 500 is appropriate. Exiting process 500 before it has completed and determined a suggested trailer brake gain may occur when certain conditions are not validated. For example, conditions for continuing process 500 may include driving the towing configuration on a straight path segment at the recommended speed. These conditions may further include the brake pedal remaining undepressed, and an uninterrupted trailer brake request. If any of these conditions is not validated, then process 500 terminates prematurely (519) and returns to the process for trailer brake gain setting (400) (FIG. 4) indicating no successful completion and not returning a suggested trailer brake gain. Exiting process 500 may occur after a predetermined number of iterations or in accordance with some other criteria indicating successful completion. Exiting the process 500 after successful completion will terminate (519) and return to the process for trailer brake gain setting (400) (FIG. 4) indicating successful completion and returning a suggested trailer brake gain. Where exit conditions are checked (507) and continued operation process 500 is appropriate, the evaluation gain (G) is set to the middle trailer brake gain (M) and the trailer brake apply signal 121 is established in accordance with the substantially maximum trailer brake torque 219 and evaluation gain (G) (509) within trailer brake control module 202. Trailer wheel rotation information is evaluated (511) and a determination is made whether a trailer wheel lock-up condition exists with the braking being commanded by the trailer brake apply signal 121 corresponding to the evaluation gain (G) (513). Wheel lock-up condition is generally understood to mean zero wheel speed or wheel rotation information indicating an incipient lock-up. In one embodiment, comparison of trailer wheel speed to tow vehicle wheel speed is performed to determine the difference. A difference in excess of a predetermined threshold, for example 95% of tow vehicle speed, may indicate a lock-up condition. In an alternative embodiment, rate of change in trailer wheel speed may be determined and compared to a predetermined threshold, for example deceleration greater than about 50 kmh/s, may indicate a lock-up condition. In another embodiment, a trailer wheel speed below a predetermined threshold speed may indicate a lock-up condition. Such a threshold speed may be related to the minimum tow vehicle speed condition for executing the automated trailer brake gain determination process 500. In yet another embodiment, wheel rotation information received from a TPM sensor having a binary roll switch may provide a calibrated wheel speed at which a binary signal indicating trailer wheel speed below a predetermined threshold speed and may indicate a lock-up condition. If a wheel lock-up condition exists, then the evaluation gain (G) may be too great for the present trailer load and road conditions, and the high trailer brake gain limit (H) is set to the evaluation gain (G) (H=G) (515). If a wheel lock-up condition does not exist, then the evaluation gain (G) may be too low for the present trailer load and road conditions, and the low trailer brake gain limit (L) is set to the evaluation gain (G) (L=G) (517). Process 500 returns to set the middle trailer brake gain (M) to the mid-point between the current high and low trailer brake gain limits, (H+L)/2, and to update the information used in determining conditions for continuing process 500, including steering angle information, tow vehicle wheel rotation information, brake pedal position, and trailer brake request (505). Each such iteration may result in a range of potential trailer brake gains that is half of the previous iteration range. And, the evaluation gain (G) is set to the midpoint between the iteratively updated range. As such, automated trailer brake gain determination process 500 rapidly converges upon a solution for a suggested trailer brake gain wherein the suggested trailer brake gain may be the largest evaluation gain not associated with a lock-up condition. In a preferred embodiment, wherein the trailer brake gain may vary between a value of 0 and 10, process 500 is normally exited after four iterations to return the suggested trailer brake gain. Alternative embodiments running more or fewer iterations in accordance with the desired granularity objectives are envisioned within the scope of the present disclosure. In another embodiment including a serial search algorithm, an initial evaluation trailer brake gain may be the low limit trailer brake gain, and the evaluation gain may be incremented by a predetermined step until a lock-up condition is detected, where after the suggested trailer brake gain may be the largest evaluation trailer brake gain not associated with the lock-up condition. In another embodiment including a serial search algorithm, an initial evaluation trailer brake gain may be the high limit trailer brake gain, and the evaluation gain may be decremented by a predetermined step until a lock-up condition is not detected, where after the suggested trailer brake gain may be the largest evaluation trailer brake gain not associated with the lock-up condition. One skilled in the art will recognize that alternative search algorithms may be employed to converge upon the suggested trailer brake gain within the scope of the present disclosure.

Figure 6:
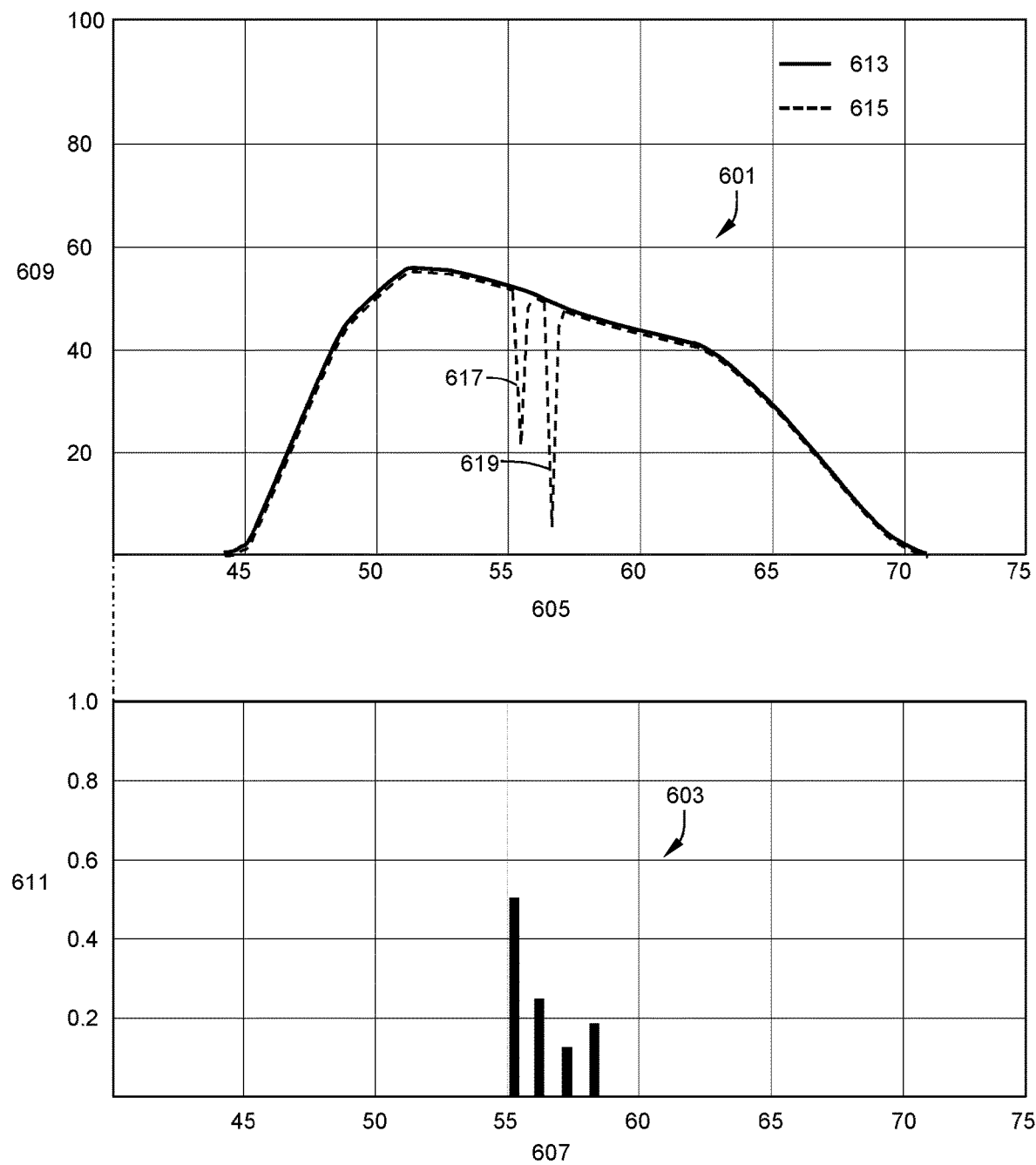
FIG. 6 illustrates tow vehicle and trailer wheel speeds and resultant trailer brake gain iterations during an exemplary automated trailer brake gain determination, in accordance with the present disclosure.

FIG. 6 illustrates an exemplary execution of the automated trailer brake gain determination process described above with respect process 500 of FIG. 5. A tow vehicle and trailer were driven together up to a speed of substantially 58 kilometers per hour and maintained above about 45 kilometers per hour during the automated trailer brake gain determination process. Graph 601 plots wheel speed along the vertical axis 609 and time along the horizontal axis 605. Solid line 613 of graph 601 illustrates tow vehicle wheel speed and broken line 615 illustrates trailer wheel speed. Graph 603 plots evaluation gain (G) as a duty cycle from 0 to 1 along the vertical axis 611 corresponding to the evaluation gain (G) scaled from 0 to 10. Time is plotted across the horizontal axis 607 and is in synchronism with the time along horizontal axis 605 of graph 601. At about 55 seconds the trailer brakes are applied with a substantially maximum trailer brake torque 219, and the automated trailer brake gain determination process executes. The first iteration evaluation gain of 5 causes a lock-up condition as shown by the rapid speed drop of the trailer wheels and large speed differential from the tow vehicle wheel speed 617. As the second iteration executes, the automated trailer brake gain determination process releases the trailer brakes by providing a null trailer brake torque 219, and the trailer wheel speed is seen to recover as there is no lock-up condition with the released trailer brakes. With the adjusted high (H) and low (L) trailer brake gain limits now of 5 and 0, respectively, and evaluation gain (G) of 2.5, the trailer brakes are applied. This second iteration evaluation gain of 2.5 also causes a lock-up condition as shown by the rapid speed drop of the trailer wheels and large speed differential from the tow vehicle wheel speed 619. As the third iteration executes, the automated trailer brake gain determination process releases the trailer brakes by providing a null trailer brake torque 219, and the trailer wheel speed is seen to recover as there is no lock-up condition with the released trailer brakes. With the adjusted high (H) and low (L) trailer brake gain limits now of 2.5 and 0, respectively, and evaluation gain (G) of 1.25, the trailer brakes are applied. This third iteration evaluation gain of 1.25 does not cause a lock-up condition as shown by undisturbed speed of the trailer wheels and substantially null speed differential from the tow vehicle wheel speed. As the fourth and final iteration executes, the automated trailer brake gain determination process releases the trailer brakes by providing a null trailer brake torque 219. With the adjusted high (H) and low (L) trailer brake gain limits now of 2.5 and 1.25, respectively, and evaluation gain (G) of 1.875, the trailer brakes are applied. This fourth iteration evaluation gain of 1.875 does not cause a lock-up condition as shown by undisturbed speed of the trailer wheels and substantially null speed differential from the tow vehicle wheel speed, and the corresponding evaluation gain (G) of 1.875 may be returned as the suggested trailer brake gain. Had the evaluation gain (G) of 1.875 caused a lock-up condition on this final iteration, the suggested trailer brake gain returned may be the previous evaluation gain (G) of 1.25 or the midpoint between it and the final iteration trailer brake gain (G) of 1.875 may be returned as the suggested trailer brake gain.

During ongoing operation of a towing configuration, road conditions and trailer loading may change. Pavement composition may vary among improved urban and highway systems and unimproved rural roads. Pavement material may vary in age, quality, and composition, such as blacktop and concrete. As well, weather conditions including temperature and moisture may vary during trailering drive cycles. Trailer loading may vary as cargo is loaded and unloaded. As well, trailer loads may vary as liquids, such as fresh and waste water levels load and unload. All of these changing conditions may have an impact upon the optimum trailer brake gain setting. Thus, it may be desirable to provide a means of detecting material changes in such conditions of the towing configuration that may benefit from re-setting the trailer brake gain.

Figure 7:
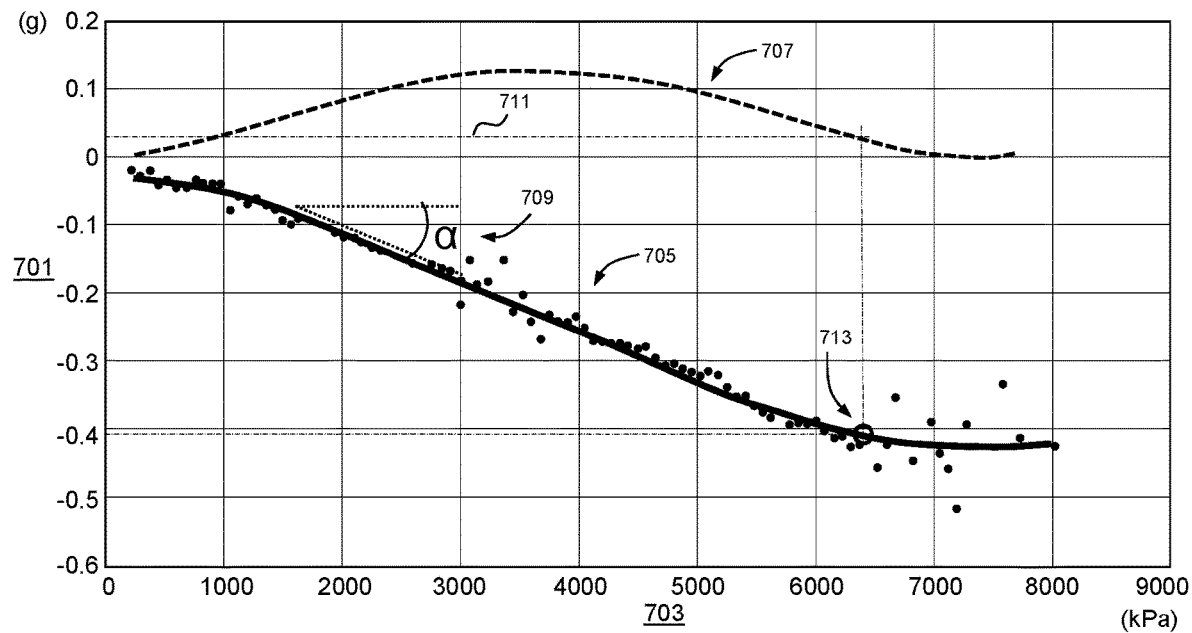
FIG. 7 illustrates deceleration data corresponding to a towing configuration, in accordance with the present disclosure.

In accordance with the present disclosure, and with further reference to FIG. 7, deceleration data corresponding to an exemplary towing configuration is illustrated. The towing configuration includes a known subject tow vehicle. Horizontal axis 703 represents brake apply pressure in kilopascals (kPa), and vertical axis 701 represents the towing configuration deceleration in (g). The exemplary towing configuration has an established trailer brake gain, and during ongoing operation a plurality of data points is collected cross various brake apply pressures. These data points represent decelerations of the towing configuration corresponding to brake apply pressures. Curve (705) is fit to these data points and slope (a) (709) is determined. Slope (709) is determined in a mid-range of brake apply pressures where the curve (705) is substantially linear. Curve (705) may, for example, correspond to a first-order curve fit to the data. A point (713) on the curve representing a maximum available deceleration with the present towing configuration load and gain setting is determined, for example, at one extreme end of the most linear portion of curve (705). If the load is changed and the gain allowed to remain the same, then the slope of the curve (705) will change the indicated maximum available deceleration (713) will also change. This may be established, for example, by the intersection of a third order polynomial (707) representing rate of change of the deceleration data or first order curve (705) with a predetermined threshold (711) as illustrated. Alternative techniques may be used in the determination of a maximum available deceleration with the present towing configuration.

Figure 8:
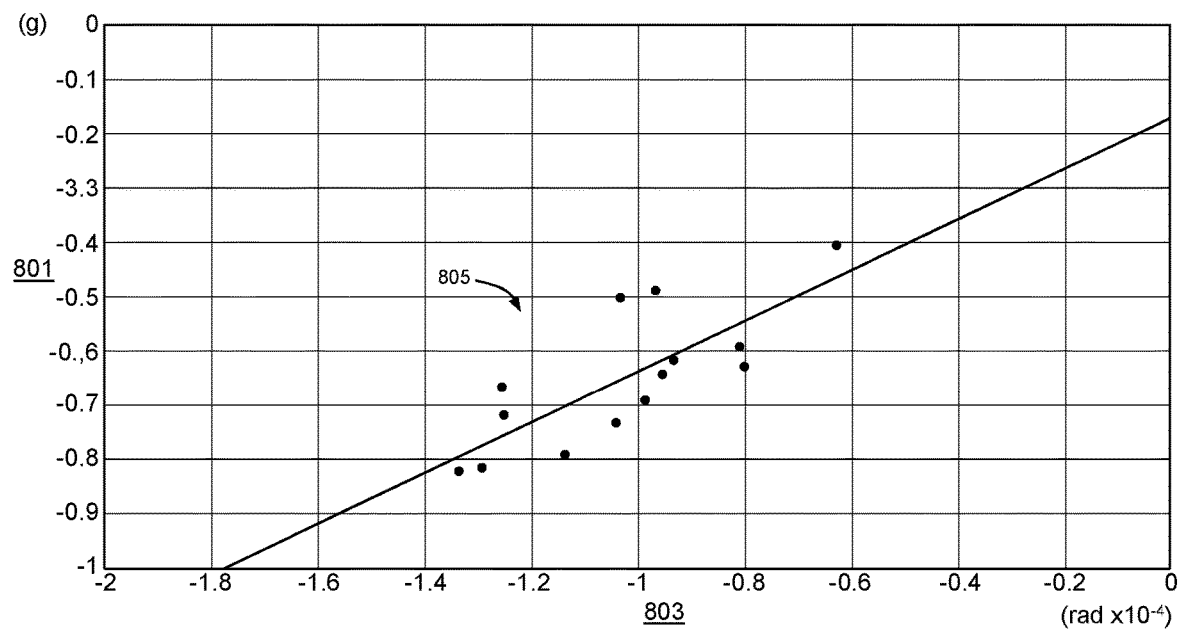
FIG. 8 illustrates calibration data corresponding to various towing configurations and loads, in accordance with the present disclosure.

FIG. 8 represents data corresponding to various towing configurations, including the known subject tow vehicle, and representing a variety of light to heavy trailering loads. Similar to the collected data represented in FIG. 7, maximum deceleration data is determined to establish the variety of data points as graphically represented in FIG. 8. The horizontal axis 803 represents deceleration slopes in radians $(rad \times 10^{-4})$ of the variety of such towing configurations, and the vertical axis 801 represents deceleration in (g). Thus, each of the points in the graph represents a maximum deceleration of a particular towing configuration, including the subject tow vehicle, along a corresponding deceleration slope. Curve (805) is a linear fitted curve to the collected data.

The data represented in FIG. 8, particularly curve (805) may be configured into a data set or look-up table stored in the brake controller 141. Subsequent to the trailer brake gain having been set, and during ongoing towing configuration drive cycles, the data points of FIG. 7 are collected, and slope (a) (709) and maximum deceleration point (713) determined. The slope may then be used as an independent variable in looking up a calibrated maximum deceleration possible from the look-up table stored in brake controller 141. Where a difference between the calibrated maximum deceleration possible and the maximum available deceleration (713) corresponding to the present towing configuration load and gain setting exceeds a predetermined threshold, the vehicle operator may be prompted to consider re-setting the trailer brake gain, either manually or through the automated trailer brake gain determination process in accordance with the present disclosure.

Figure 9:
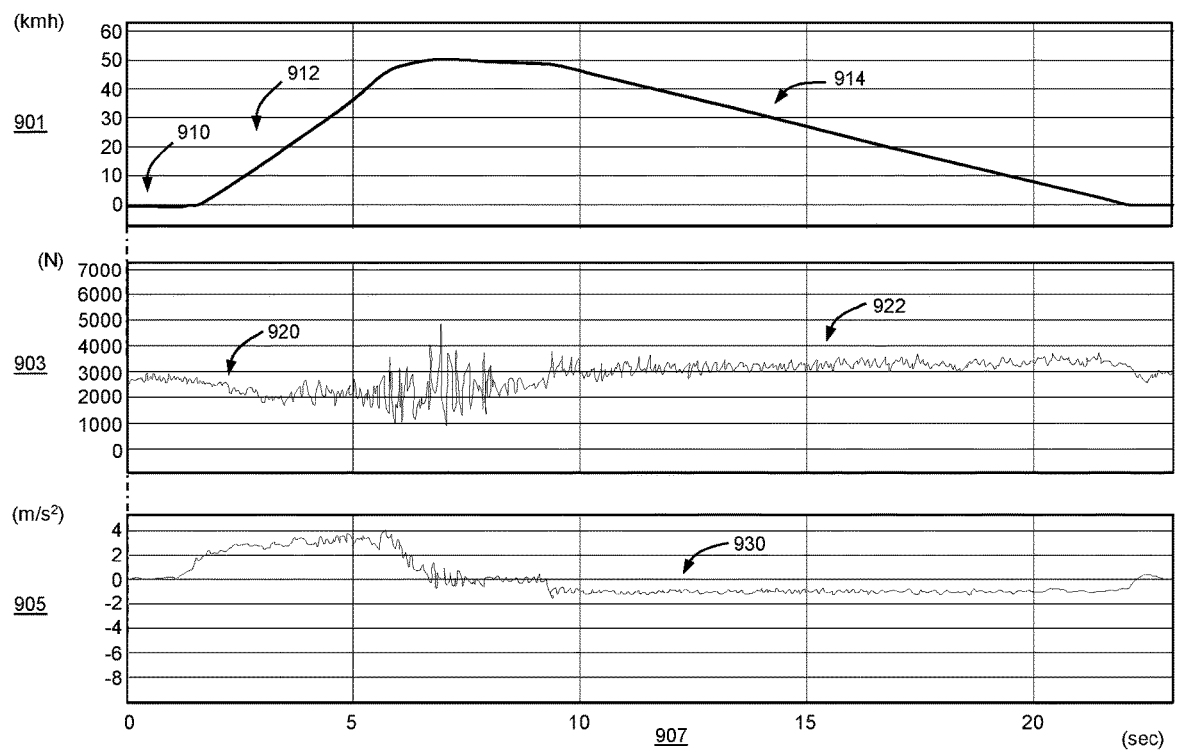
FIG. 9 illustrates a towing configuration speed profile, tongue load and deceleration with trailer braking only, in accordance with the present disclosure.

In accordance with other aspects of the present disclosure, the process of setting of trailer brake gain utilizes only application of trailer brakes to the exclusion of the tow vehicle brakes. It is recognized and appreciated that setting trailer brake gain in such a manner results in limited load shifting to the trailer tongue and ultimately to the tow vehicle. FIG. 9 shows data collected during a drive cycle of a trailer configuration with trailer brake application exclusively, as would be experienced while setting trailer brake gain. The FIG. 9 drive cycle represents a towing configuration drive cycle deceleration load shift of about 3 percent and a deceleration of about <0.2 g. In the top graph of FIG. 9 illustrating towing configuration speed 901 along the vertical axis (kmh) over time 907 along the horizontal axis (sec), the towing configuration is brought up to speed (912) from rest (910) reaching a maximum speed of substantially 50 kmh at about 7 seconds. Subsequently, trailer brakes are applied, and the towing configuration is gradually decelerated (914). In the middle graph of FIG. 9 illustrating force on the trailer hitch 903 along the vertical axis (N) over time 907 along the horizontal axis (sec), an initial at rest tongue load (920) and a tongue load (922) during deceleration are shown. In the bottom graph of FIG. 9 illustrating towing configuration longitudinal acceleration 905 along the vertical axis (m/s2) over time 907 along the horizontal axis (sec), deceleration of less than 0.2 g is observed during the gradual deceleration (930).

Figure 10:
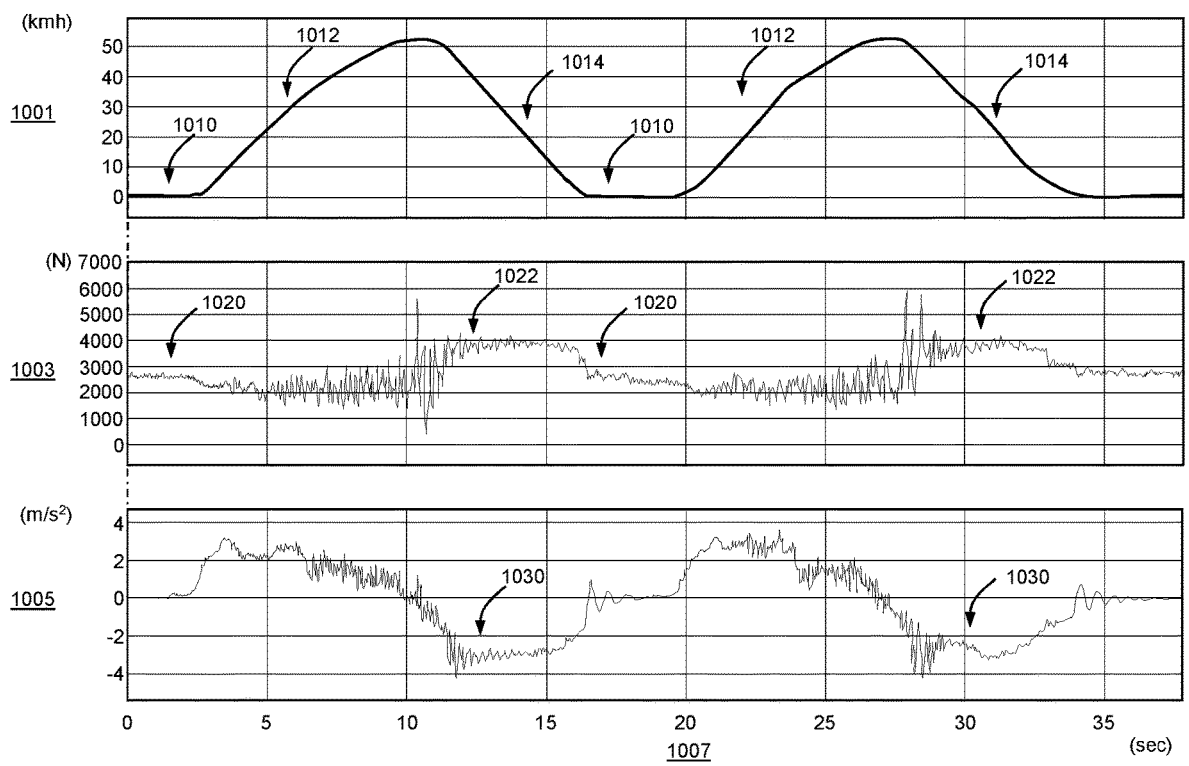
FIG. 10 illustrates a towing configuration speed profile, tongue load and deceleration with tow vehicle and trailer braking, in accordance with the present disclosure.

It is similarly recognized and appreciated that during actual towing configuration driving, substantially more load shifting to the trailer tongue and ultimately to the tow vehicle occurs than during the process of setting of trailer brake gain wherein the trailer brakes only are applied. FIG. 10 shows data collected during application of vehicle and trailer brakes as would be the case in normal road operation of the towing configuration. FIG. 10 drive cycle illustrates during more aggressive deceleration, a load shift of about 12 percent at a deceleration of between about 0.2 g and 0.4 g. In the top graph of FIG. 10 illustrating towing configuration speed 1001 along the vertical axis (kmh) over time 1007 along the horizontal axis (sec), the towing configuration is brought up to speed (1012) from rest (1010) reaching a maximum speed of substantially 50 kmh at about 9 seconds. Subsequently, tow vehicle and trailer brakes are applied, and the towing configuration is decelerated (1014). In the middle graph of FIG. 9 illustrating force on the trailer hitch 1003 along the vertical axis (N) over time 1007 along the horizontal (sec), an initial at rest tongue load 1020 and a tongue load 1022 during deceleration are shown. In the bottom graph of FIG. 9 illustrating towing configuration longitudinal acceleration 1005 along the vertical axis (m/s2) over time 1007 along the horizontal axis (sec), deceleration of less than 0.2 g is observed during the more aggressive deceleration (1030).

One having ordinary skill in the art may therefore recognize that the trailer gain setting established by the automated trailer brake gain process may be shifted by a correction factor such that the suggested trailer brake gain is somewhat lower to account for the known load shifting that may occur during heavier decelerations of the towing configuration likely to be encountered during simultaneous tow vehicle and trailer braking. One having ordinary skill in the art will recognize that trailer dimensions and specifications may affect such correction factor and it may be desirable to account for such considerations with any correction factor. Therefore, such a correction factor may be approximated by a constant value, but the value may change in accordance with trailer specifics. Alternatively, the trailer brake gain setting may be scaled by a factor, for example 10%.

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

Or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. An apparatus for determining a trailer brake gain in a towing configuration including a tow vehicle and a trailer, comprising:
   a trailer brake system responsive to a trailer brake apply signal to apply trailer brakes;
   at least one trailer wheel including a corresponding rotation sensor providing trailer wheel rotation information for the at least one trailer wheel; and
   a brake controller configured to implement an automated trailer brake gain determination process upon validation of predetermined conditions, the automated trailer brake gain determination process comprising:
   monitoring the trailer wheel rotation information;
   providing trailer brake control signals comprising a maximum trailer brake torque subjected to a plurality of different evaluation trailer brake gains; and
   determining the trailer brake gain based upon trailer wheel rotation information corresponding to the plurality of different evaluation trailer brake gains.

2. The apparatus of claim 1, wherein the predetermined conditions comprise the towing configuration travelling along a straight path above a predetermined speed.

3. The apparatus of claim 1, wherein the trailer brake control signals are provided iteratively to converge upon the largest evaluation trailer brake gain not associated with a lock-up condition of the at least one trailer wheel as the trailer brake gain.

4. The apparatus of claim 3, wherein convergence upon the largest evaluation trailer brake gain comprises a serial search algorithm.

5. The apparatus of claim 1, wherein trailer brake control signals are provided in response to an operator request to apply trailer brakes.

6. The apparatus of claim 3, wherein the lock-up condition comprises at least one of a comparison of trailer wheel speed and tow vehicle wheel speed, a comparison of trailer wheel speed to a threshold speed, and a comparison of a rate of change in trailer wheel speed to a threshold rate.

7. The apparatus of claim 1, wherein the rotation sensor is integrated with a tire pressure monitor sensor.

8. The apparatus of claim 1, wherein the rotation sensor providing trailer wheel rotation information comprises wireless communication of trailer wheel rotation information.

9. The apparatus of claim 1, wherein the rotation sensor comprises a vision system.

10. The apparatus of claim 1, wherein the brake controller is further configured to terminate the automated trailer brake gain determination process upon invalidation of at least one of the predetermined conditions.

11. A method for determining a trailer brake gain in a towing configuration including a tow vehicle and a trailer, comprising:
   providing, to a processor, trailer wheel rotation information;
   providing, by the processor, trailer brake control signals comprising a maximum trailer brake torque subjected to a plurality of different evaluation trailer brake gains; and determining, by the processor, the trailer brake gain based upon the trailer wheel rotation information corresponding to the plurality of different evaluation trailer brake gains.

12. The method of claim 11, wherein the trailer brake control signals are provided iteratively to converge upon the largest evaluation trailer brake gain not associated with a trailer wheel lock-up condition as the trailer brake gain.

13. The method of claim 11, wherein trailer brake control signals are provided in response to an operator request to apply trailer brakes.

14. The apparatus of claim 12, wherein convergence upon the largest evaluation trailer brake gain comprises a serial search algorithm.

15. The method of claim 12, wherein the lock-up condition comprises at least one of a comparison of trailer wheel speed and tow vehicle wheel speed, a comparison of trailer wheel speed to a threshold speed, and a comparison of a rate of change in trailer wheel speed to a threshold rate.

16. The method of claim 11, wherein the trailer wheel rotation information is provided via wireless communication.

17. An apparatus for determining a trailer brake gain in a towing configuration including a tow vehicle and a trailer, comprising:
   a trailer brake system responsive to a trailer brake apply signal to apply trailer brakes;
   at least one trailer wheel including a corresponding rotation sensor providing trailer wheel rotation information for the at least one trailer wheel; and
   a brake controller configured to implement an automated trailer brake gain determination process upon validation of predetermined conditions, the automated trailer brake gain determination process comprising:
   monitoring the trailer wheel rotation information;
   providing trailer brake control signals at a plurality of different evaluation trailer brake gains; and
   determining the trailer brake gain based upon trailer wheel rotation information corresponding to the plurality of different evaluation trailer brake gains;
   wherein the trailer brake control signals are provided iteratively to converge upon the largest evaluation trailer brake gain not associated with a lock-up condition of the at least one trailer wheel as the trailer brake gain; and
   wherein convergence upon the largest evaluation trailer brake gain comprises a binary search algorithm.

18. A method for determining a trailer brake gain in a towing configuration including a tow vehicle and a trailer, comprising:
   providing, to a processor, trailer wheel rotation information;
   providing, by the processor, trailer brake control signals at a plurality of different evaluation trailer brake gains; and
   determining, by the processor, the trailer brake gain based upon the trailer wheel rotation information corresponding to the plurality of different evaluation trailer brake gains;
   wherein the trailer brake control signals are provided iteratively to converge upon the largest evaluation trailer brake gain not associated with a trailer wheel lock-up condition as the trailer brake gain; and
   wherein convergence upon the largest evaluation trailer brake gain comprises a binary search algorithm.

19. A method for determining a trailer brake gain in a towing configuration including a tow vehicle and a trailer, comprising:
   detecting, by a processor, that the trailer and tow vehicle are coupled into the towing configuration;
   conveying to a tow vehicle operator, by the processor, predetermined conditions required to automatically determine the trailer brake gain, the predetermined conditions comprising driving the towing configuration in a straight path above a predetermined speed;
   sensing trailer wheel rotation with a tire pressure monitor configured to sense trailer wheel rotation and wirelessly communicate trailer wheel rotation information to the processor;
   receiving, by the processor, a request for engagement of the trailer brakes while the predetermined conditions are validated; and
   iteratively providing, by the processor, trailer brake control signals at a plurality of different evaluation trailer brake gains to converge upon the largest evaluation trailer brake gain not associated with a trailer wheel lock-up condition as the trailer brake gain.

20. The method of claim 19, wherein convergence upon the largest evaluation trailer brake gain comprises one of a binary search algorithm and a serial search algorithm.

* * * * *